(12) United States Patent
Suzuki et al.

(10) Patent No.: US 6,298,026 B1
(45) Date of Patent: Oct. 2, 2001

(54) MAGNETO-OPTICAL HEAD APPARATUS USING EVANESCENT LIGHT

(75) Inventors: Yoshihisa Suzuki, Bisai; Sayoko Tanaka; Kenichiro Mitani, both of Gifu, all of (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/401,790

(22) Filed: Sep. 22, 1999

(30) Foreign Application Priority Data

Sep. 24, 1998 (JP) .................................................. 10-269601

(51) Int. Cl.[7] .............................. G11B 7/00; G01D 15/12
(52) U.S. Cl. ...................... 369/112; 369/44.23; 369/44.14
(58) Field of Search .................................... 369/118, 112, 369/13, 44.23, 44.14, 44.15, 126; 359/819, 808, 811

(56) References Cited

U.S. PATENT DOCUMENTS

| 5,729,393 | * | 3/1998 | Lee et al. | 359/819 |
| 5,883,872 | * | 3/1999 | Kino | 369/112 |
| 5,917,788 | * | 6/1999 | Mowry | 369/44.23 |
| 5,963,532 | * | 10/1999 | Hajjar | 369/112 |
| 6,104,687 | * | 8/2000 | Lee et al. | 369/112 |

FOREIGN PATENT DOCUMENTS 10-162443   6/1998  (JP) .

OTHER PUBLICATIONS

US HDD Makers Turn to 10–Gbit/InCh[2] Near Field Record; Nikkei Electronics Asia, Aug. 1997, pp. 46–51.

* cited by examiner

Primary Examiner—David Hudspeth
Assistant Examiner—Kim-Kwok Chu
(74) Attorney, Agent, or Firm—Armstrong Westerman Hattori McLeland & Naughton, LLP

(57) ABSTRACT

A magneto-optical head includes an optical member, objective lens, SIL and coil. The magneto-optical head converts a laser beam to an evanescent light and directs it to a magneto-optical recording medium. Further, the magneto-optical head applies a magnetic field to the magneto-optical recording medium. When tilt is caused, it decreases the tilt angle. The optical member refracts the laser beam to a prescribed direction to be directed to the objective lens when the laser beam is displaced from a designed optical axis. The objective lens allows the laser beam to be focused onto a point on an end face of the SIL. Further, the SIL emits the evanescent light. The optical member is arranged in contact with the optical member. As a result, a signal can accurately be recorded or reproduced even when tilt is caused to an optical disk while alleviating the problem associated with the tilt.

14 Claims, 7 Drawing Sheets

US 6,298,026 B1

MAGNETO-OPTICAL HEAD APPARATUS USING EVANESCENT LIGHT

BACKGROUND OF THE INVENTION

1. Field of the Invention

The present invention relates to magneto-optical head apparatuses recording/reproducing a signal to/from a magneto-optical recording medium using a laser beam and magnetic field. The present invention more particularly relates to a magneto-optical head apparatus capable of alleviating the problem of tilt when tilt is caused to the magneto-optical recording medium.

2. Description of the Background Art

A magneto-optical recording medium is known as a rewritable recording medium with a large recording capacity and high reliability, and has come into practical use as a computer memory or the like. Recently, a magneto-optical recording medium having a recording capacity of 6.0 Gbytes has been developed as an AS-MO (Advanced Storage Magneto Optical disk) standard, and will soon be come into practical use. Reproduction of a signal from such magneto-optical recording medium with high recording density is performed as follows. A magnetic domain of a recording layer of the magneto-optical recording medium is transferred to a reproduction layer, and a detection window is formed in the reproduction layer such that only the transferred magnetic domain is detected. Thus, the transferred magnetic domain is detected from the detection window. This method is called MSR Magnetically induced Super Resolution).

Another technology has also been developed in which an alternating magnetic field is applied in reproducing a signal from a magneto-optical recording medium, and a magnetic domain of a recording layer is transferred and enlarged to a reproduction layer by a laser beam and the alternating field. This is called a magnetic domain expansion readout technology. A magneto-optical recording medium capable of recording and/or reproducing a signal of 14 Gbytes has been proposed with use of this technology.

A magneto-optical head in which an evanescent light is used for recording/reproducing a signal to/from a magneto-optical recording medium with high density is disclosed in *NIEKKEI ELECTRONICS ASIA*, August 1997, pp.46–51. The evanescent light is produced as follows. Referring to FIG. 1A, a laser beam is collected by an objective lens 120, directed to an SIL (Solid Immersion Lens) 121 onto a point 123 at an end face of SIL 121, and then emitted from point 123. As the laser beam must be collectively directed to point 123 to produce the evanescent light, objective lens 120 and SIL 121 are integrally supported by a base 122. To direct the evanescent light to an optical disk, a distance between SIL 121 and the optical disk must not exceed 200 nm. Thus, a flying head has been proposed which allows SIL 121 to fly as the optical disk rotates at a prescribed rate.

However, use of the flying head is associated with the following problem. More specifically, if tilt is caused to the optical disk, SIL 121 also tilts with the optical disk, as shown in FIG. 1B. As a result, objective lens 120 that is supported integrally with SIL 121 also tilts. Then, an optical axis of the laser beam directed to objective lens 120 is considerably displaced from that of objective lens 120, thereby causing a focal point at point 124 rather than at proper point 123.

As described above, the use of the proposed flying head does not enable accurate recording or reproduction of the signal since the laser beam is not collected at the proper point when there is a problem of tilt.

SUMMARY OF THE INVENTION

Therefore, an object of the present invention is to provide a magneto-optical head apparatus capable of accurately recording or reproducing a signal even when tilt is caused to an optical disk by alleviating the problem of the tilt.

The magneto-optical head according to the present invention includes a solid immersion lens, objective lens and optical member. The solid immersion lens has an end face opposite to a magneto-optical recording medium. The objective lens is provided on the side of a hemispherical surface of the solid immersion lens, and has the same optical axis as the solid immersion lens and a focal point positioned on the end face of the solid immersion lens. The optical member is provided on the opposite side of the solid immersion lens of the objective lens.

Thus, even when tilt is caused to the magneto-optical recording medium and the solid immersion lens and objective lens are also tilted, the optical member can refract the laser beam in a direction in which the optical axis of the laser beam comes closer to that of the objective lens, depending on the amount of the tilt. Therefore, the problem of the tilt is alleviated.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1A:
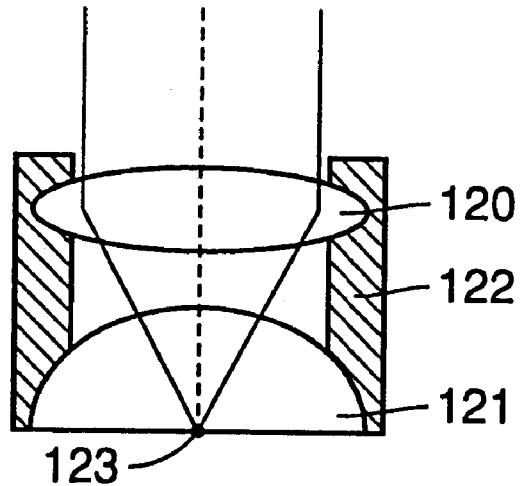
FIG. 1A is a diagram showing a structure of a conventional flying head.
Figure 1B:
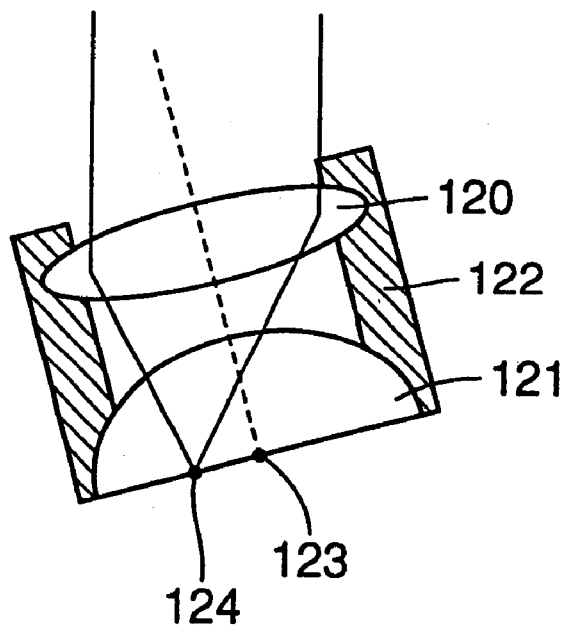
FIG. 1B is a diagram shown in conjunction with the problem associated therewith.
Figure 2A:
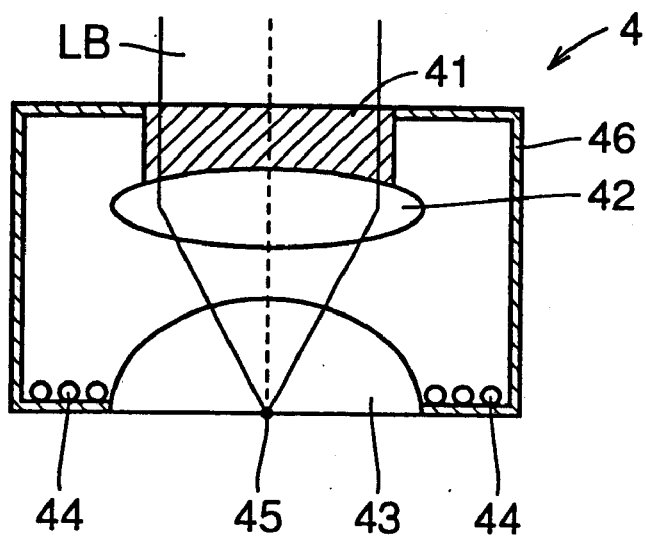
FIGS. 2A and 2B are diagrams showing structures of a magneto-optical head used for a magneto-optical head apparatus according to the present invention.
Figure 2B:
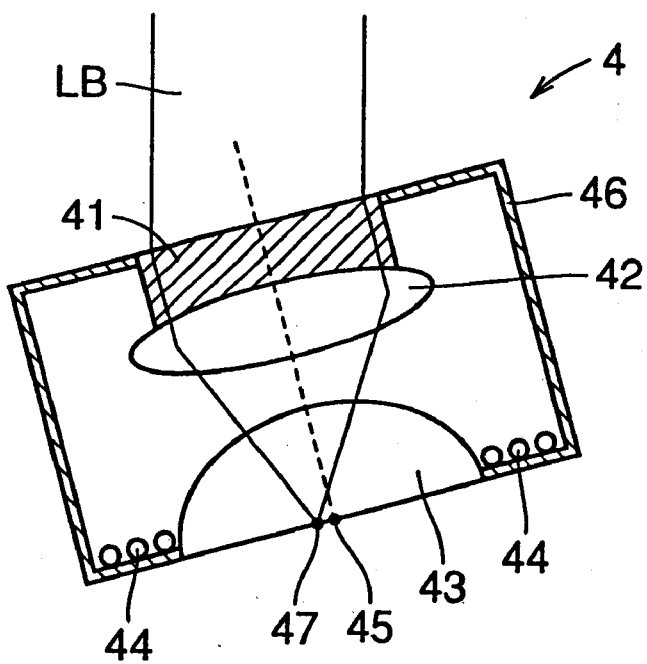

An embodiment of the present invention will now be described with reference to the drawings. Referring to FIG. 2A, a magneto-optical head 4 capable of directing an evanescent light to a magneto-optical recording medium and applying a magnetic field includes an optic member 41, objective lens 42, SIL 43 and coil 44. As shown in FIG. 2B, optical member 41 refracts a laser beam LB toward a prescribed direction to be directed to objective lens 42 when laser beam LB is directed to optical member 41 being displaced from the designed optical axis. Objective lens 42 allows laser beam LB to be focused onto a point 45 on an end face of SIL 43. SIL 43 emits the evanescent light.

As optical member 41, objective lens 42 and SIL 43 are integrally supported by a base 46, optical member 41 and objective lens 42 tilt if SIL 43 tilts with the magneto-optical recording medium. Optical member 41 and objective lens 42 are in contact with each other. A coil 44 which generates a magnetic field is wound spirally around SIL 43. Thus, a region of the evanescent light emitted from SIL 43 and a region of the magnetic field applied by coil 44 readily match.

The present invention is characterized in that optical member 41 refracting laser beam LB toward the direction coming closer to the optical axis of objective lens 42 when magneto-optical head 4 is tilted is provided on the incident side of objective lens 42. Thus, when tilt is caused and magneto-optical head 4 tilts, laser beam LB can be focused onto a point 47 close to proper point 45. Accordingly, a recording property or reproduction property of a signal is not degraded.

Figure 3A:
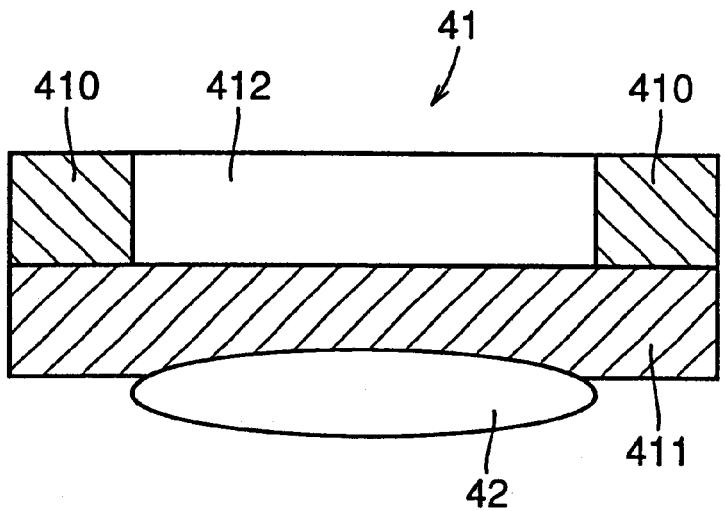
FIG. 3A is a cross sectional view showing an exemplary optical member.
Figure 3B:
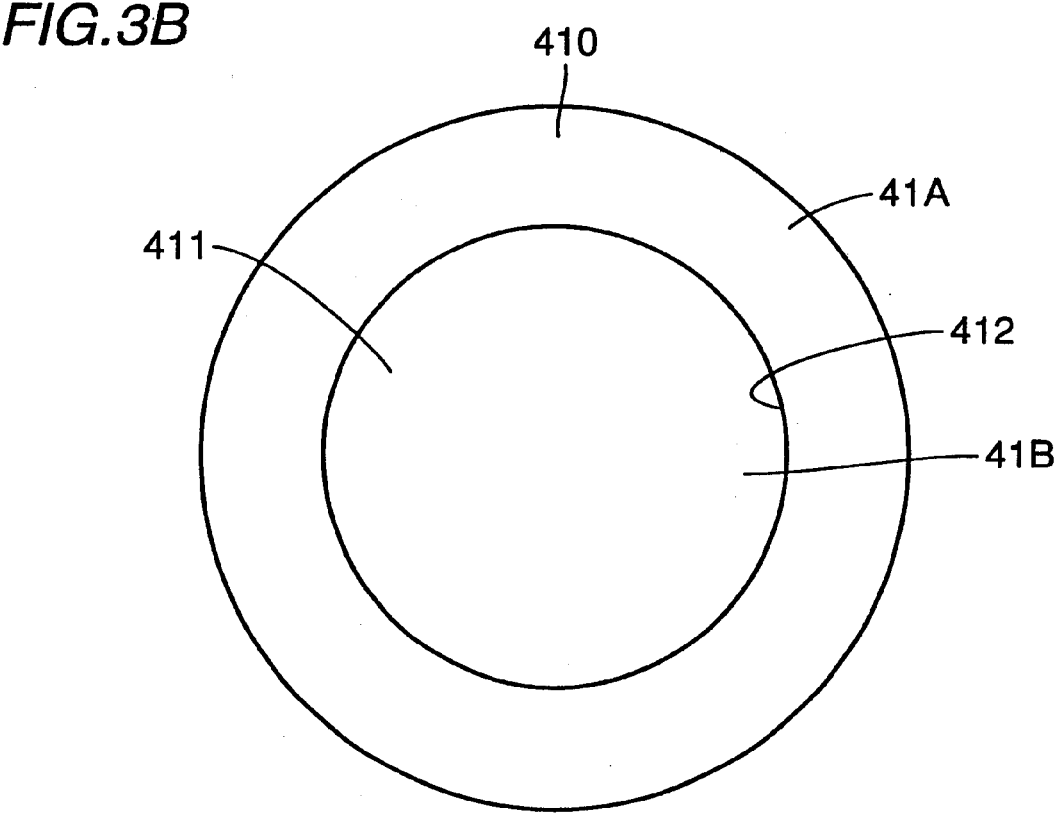
FIG. 3B is a plan view thereof.

Referring to FIGS. 3A and 3B, optical member 41 will be described in detail. Optical member 41 includes a glass member 410 having a hole 412 formed in a region through which laser beam LB passes, and a member 411 formed over an entire surface of glass member 410 and having a refractive index of 1.5 to 2.5. The side opposite to the incident side (i.e., the emitting side) for laser beam LB of member 411 is in contact with objective lens 42 (see FIG. 3A). The structure of optical member 41 when viewed from above is as shown in FIG. 3B. A region 41B has only member 411, and a region 41A has only glass member 410. For a material of member 411, for example, SiO, SiN and diamond, respectively having refractive indices of 1.4–1.6, 1.9–2.1 and 2.4–2.6 may be employed.

Figure 4:
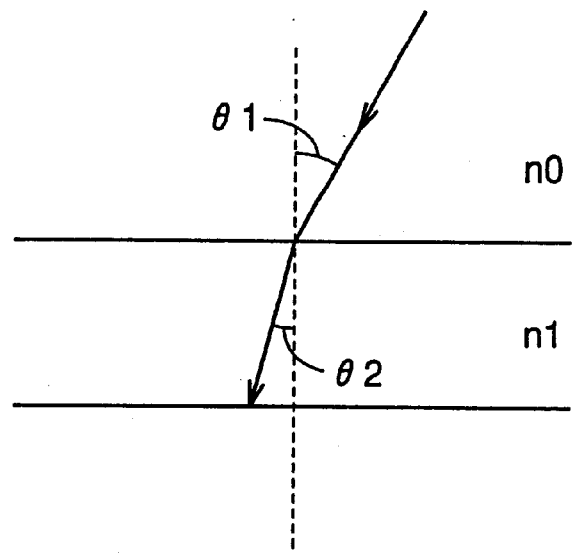
FIG. 4 is a diagram shown in conjunction with refraction at a boundary of media having different refractive indices.

When the laser beam travels from a medium having a refractive index of n0 to that having a refractive index of n1 (where n1 is greater than n0), it is refracted as shown in FIG. 4. Assuming that angles formed by the laser beam with respect to the normal line in the media with refractive indices of n0 and n1 are respectively $\theta 1$ and $\theta 2$, the following equation is obtained.

$$n0\sin(\theta 1) = n1\sin(\theta 2) \quad (1)$$

The following Tables 1 to 3 show values of $\theta 2$ calculated in accordance with the above equation (1) when SiO, SiN and diamond respectively having refractive indices of 1.5, 2.0 and 2.5 are used for member 411 of FIG. 3A.

TABLE 1

| SiO | | |
|---|---|---|
| n0, n1 | θ 1 (mrad.) | θ 2 (mrad.) |
| n0 = 1.0, n1 = 1.5 | 1.0 | 0.63 |
| n0 = 1.0, n1 = 1.5 | 2.0 | 1.29 |
| n0 = 1.0, n1 = 1.5 | 3.0 | 1.94 |
| n0 = 1.0, n1 = 1.5 | 4.0 | 2.58 |
| n0 = 1.0, n1 = 1.5 | 5.0 | 3.23 |

TABLE 2

| SiN | | |
|---|---|---|
| n0, n1 | θ 1 (mrad.) | θ 2 (mrad.) |
| n0 = 1.0, n1 = 2.0 | 1.0 | 0.48 |
| n0 = 1.0, n1 = 2.0 | 2.0 | 0.97 |
| n0 = 1.0, n1 = 2.0 | 3.0 | 1.45 |
| n0 = 1.0, n1 = 2.0 | 4.0 | 1.94 |
| n0 = 1.0, n1 = 2.0 | 5.0 | 2.42 |

TABLE 3

| Diamond | | |
|---|---|---|
| n0, n1 | θ 1 (mrad.) | θ 2 (mrad.) |
| n0 = 1.0, n1 = 2.5 | 1.0 | 0.39 |
| n0 = 1.0, n1 = 2.5 | 2.0 | 0.78 |
| n0 = 1.0, n1 = 2.5 | 3.0 | 1.16 |
| n0 = 1.0, n1 = 2.5 | 4.0 | 1.55 |
| n0 = 1.0, n1 = 2.5 | 5.0 | 1.94 |

As the maximum tilt angle is ±5mrad., 1, 2, 3, 4, and 5mrad. are used as values of $\theta 1$. It is apparent from the results shown in Tables 1 to 3 that the use of a material having a high refractive index for member 411 of optical member 41 can make the value of $\theta 2$ small. The smaller $\theta 2$ means that the laser beam directed to optical member 41 is refracted by member 411 toward a direction coming closer to the optical axis when tilt is not caused. Thus, the problem of tilt is alleviated if the value of $\theta 2$ can be small.

Figure 5:
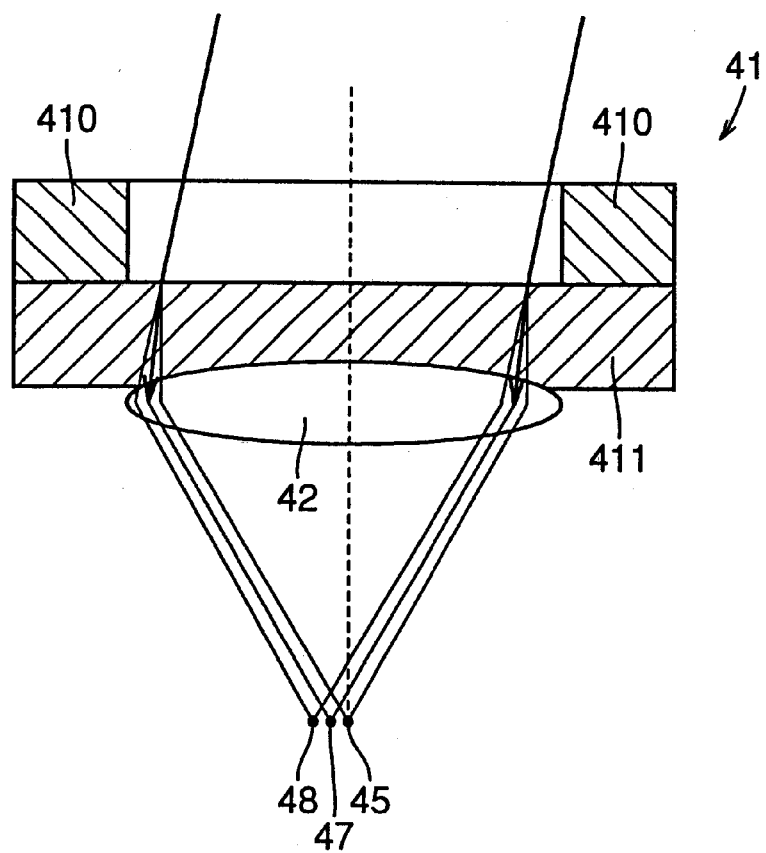
FIG. 5 is a diagram shown in conjunction with an effect of the optical member shown in FIG. 3A when tilt is caused.

As shown in FIG. 5, laser beam LB is directed to and refracted by member 411 of optical member 41 to be focused onto point 47 which is close to proper point 45. Point 47 is closer to proper point 45 than point 48, which is in the case where the laser beam does not pass through member 411 when tilt is caused. Thus, an amount of displacement from the proper optical axis due to tilt is reduced by optical member 41.

Figure 6:
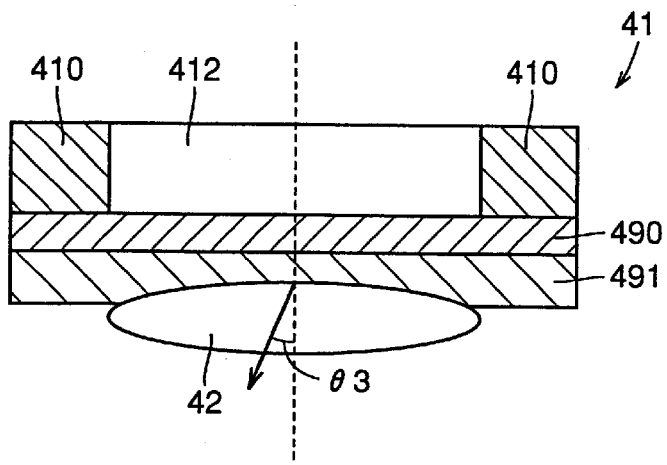
FIG. 6 is a cross sectional view showing another example of the optical member shown in FIG. 2A.

The optical member is not limited to that shown in FIG. 3A and may be an optical member 49 shown in FIG. 6. Optical member 49 includes two parts forming member 411 of optical member 41 shown in FIG. 2A. More specifically, it includes a first member 490 having a refractive index of 2.0 (with tolerance of ±0.1) and a second member 491 having a refractive index of 2.5 (with tolerance of ±0.1). A surface on the emitting side for the laser beam of second member 491 is in contact with objective lens 42. For materials of first member 490 and second member 491, for example, SiN and diamond are respectively employed.

The following Table 4 shows values of $\theta 3$ formed by the laser beam which is directed to objective lens 42 from second member 491 with respect to the proper optical axis and calculated in accordance with the above equation (1), as in the case of FIG. 2A.

TABLE 4

| SiN, Diamond | | | | | |
|---|---|---|---|---|---|
| n0, | n1, | n2 | θ 1 (mrad.) | θ 2 (mrad.) | θ 3 (mrad.) |
| n0 = 1.0, | n1 = 2.0, | n2 = 2.5 | 1.0 | 0.48 | 0.37 |
| n0 = 1.0, | n1 = 2.0, | n2 = 2.5 | 2.0 | 0.97 | 0.75 |
| n0 = 1.0, | n1 = 2.0, | n2 = 2.5 | 3.0 | 1.45 | 1.12 |

TABLE 4-continued

| | | | SiN, Diamond | | |
|---|---|---|---|---|---|
| n0, | n1, | n2 | θ1 (mrad.) | θ2 (mrad.) | θ3 (mrad.) |
| n0 = 1.0, | n1 = 2.0, | n2 = 2.5 | 4.0 | 1.94 | 1.51 |
| n0 = 1.0, | n1 = 2.0, | n2 = 2.5 | 5.0 | 2.42 | 1.88 |

The values of θ3 shown in Table 4 are smaller than the values of θ2 shown in Tables 1 to 3. The tilt angle is further decreased by providing a plurality of members in the region through which the laser beam passes in an order of decreasing refractive index in the direction of the laser beam.

Figure 7:
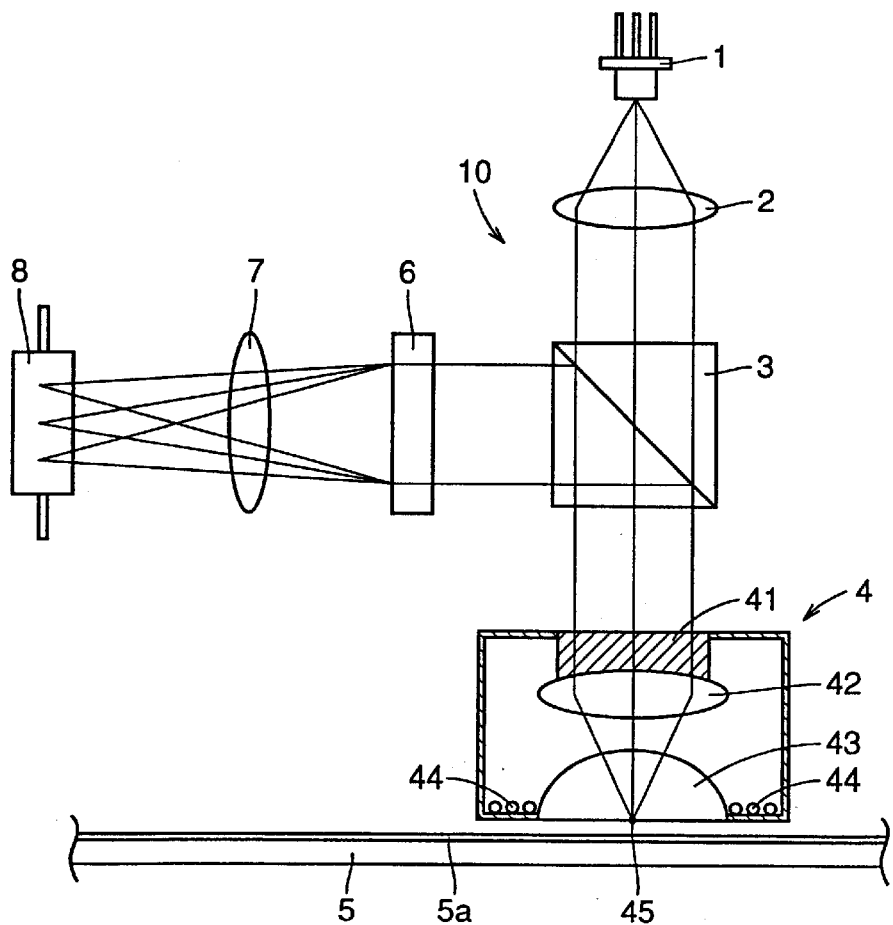
FIG. 7 is a diagram showing a magneto-optical head apparatus including the magneto-optical head shown in FIG. 2.

Referring to FIG. 7, a magneto-optical head apparatus 10 according to the present invention will be described. Magneto-optical head apparatus 10 includes a semiconductor laser 1, collimator lens 2, beam splitter 3, magneto-optical head 4, Wollaston prism 6, collective lens 7 and optical detector 8. Semiconductor laser 1 generates a laser beam having a wavelength of 635 nm (with tolerance of ±15). Collimator lens 2 collimates the laser beam. Beam splitter transmits the laser beam from collimator lens 2 and reflects the reflected light from magneto-optical recording medium 5 to a direction changed 90° from the original direction. Magneto-optical head 4 converts the laser, beam to the evanescent light, directs the evanescent light to magneto-optical recording medium 5, and applies a magnetic field to magneto-optical recording medium 5. When tilt is caused, it also decreases the tilt angle. Wollaston prism 6 divides the reflected light from magneto-optical recording medium 5 into the laser beam only having an S polarization component, the laser beam only having a P polarization component and the laser beam having the S polarization component and P polarization component. Collective lens 7 collects the laser beam. Optical detector 8 detects the laser beam only having the S polarization component, the laser beam only having the P polarization component and the laser beam having the S and P polarization components. In magneto-optical head apparatus 10, magneto-optical head 4 floats as magneto-optical recording medium 5 rotates at a prescribed rate, and a distance between SIL 43 of magneto-optical head 4 and magneto-optical recording medium 5 are maintained at or shorter than 200 nm.

In recording a signal to magneto-optical recording medium 5 using magneto-optical head apparatus 10, the laser beam with a wavelength of 635 nm generated by semiconductor laser 1 is collimated by collimator lens 2, transmitted through beam splitter 3, and directed to optical member 41 of magneto-optical head 4. When tilt is not caused, the laser beam is perpendicularly directed to optical member 41. Thus, the laser beam is directly transmitted through optical member 41 without refraction and directed to objective lens 42. Then, the laser beam is collected by objective lens 42 and directed onto point 45 of SIL 43. In this case, a numerical aperture of objective lens 42 is 0.6 and a spot size of the laser beam at point 45 is about 0.9 μm. From point 45, the evanescent light is directed to a magnetic layer 5a of magneto-optical recording medium 5. In this case, a spot size of the evanescent light equals to a value obtained by dividing the spot size of 0.9 μm at point 45 by a refractive index of the material forming SIL 43. When SIL 43 is formed of glass, 0.9/1.5=0.6 μm. A magnetic field is applied to magnetic layer 5a from coil 44 of magneto-optical head 4. Then, the evanescent light heats magnetic layer 5a of magneto-optical recording medium 5 to a prescribed temperature, and a signal is recorded by the applied magnetic field. For magnetic modulation, a direction of current flowing through coil 44 is modulated based on recording data. In this case, the light is continuously directed to magneto-optical recording medium 5. On the other hand, for light intensity modulation, semiconductor laser 1 is driven based on the recording data and the pulsed light is directed to magneto-optical recording medium 5. In this case, a magnetic field in a prescribed direction is applied to magneto-optical recording medium 5.

For reproducing a signal by magneto-optical head apparatus 10, the laser beam with a wavelength of 635 nm which has been generated by semiconductor laser 1 is collimated by collimator lens 2, transmitted through beam splitter 3 and directed to optical member 41 of magneto-optical head 41. As the laser beam is perpendicularly directed to optical member 41 when tilt is not caused, the laser beam is directly transmitted through optical member 41 without refraction and directed to objective lens 42. The laser beam is collected by objective lens 42 and directed to point 45 of SIL 43. The evanescent light is directed to magnetic layer 5a of magneto-optical recording medium 5 from point 45. A magnetic field is not applied from coil 44 when reproducing a signal by MSR. The evanescent light which has been reflected by magnetic layer 5a is returned to point 45, converted to a general laser beam, and further directed back to beam splitter 3 through objective lens 42 and optical member 41. The laser beam which has been reflected to a direction changed 90° from the original direction is divided by the Wollaston prism into the laser beam having only the S polarization component, the laser beam having only the P polarization component and the laser beam having the S and P polarization components. The laser beam is collected by collective lens 7 and detected by optical detector 8.

For reproducing a signal by enlargement of a magnetic domain, in addition to what has been described in the above, the evanescent light is directed from magneto-optical head 4, and an alternating magnetic field for enlargement of the magnetic domain is applied to magnetic layer 5a of magneto-optical recording medium 5.

Figure 8:
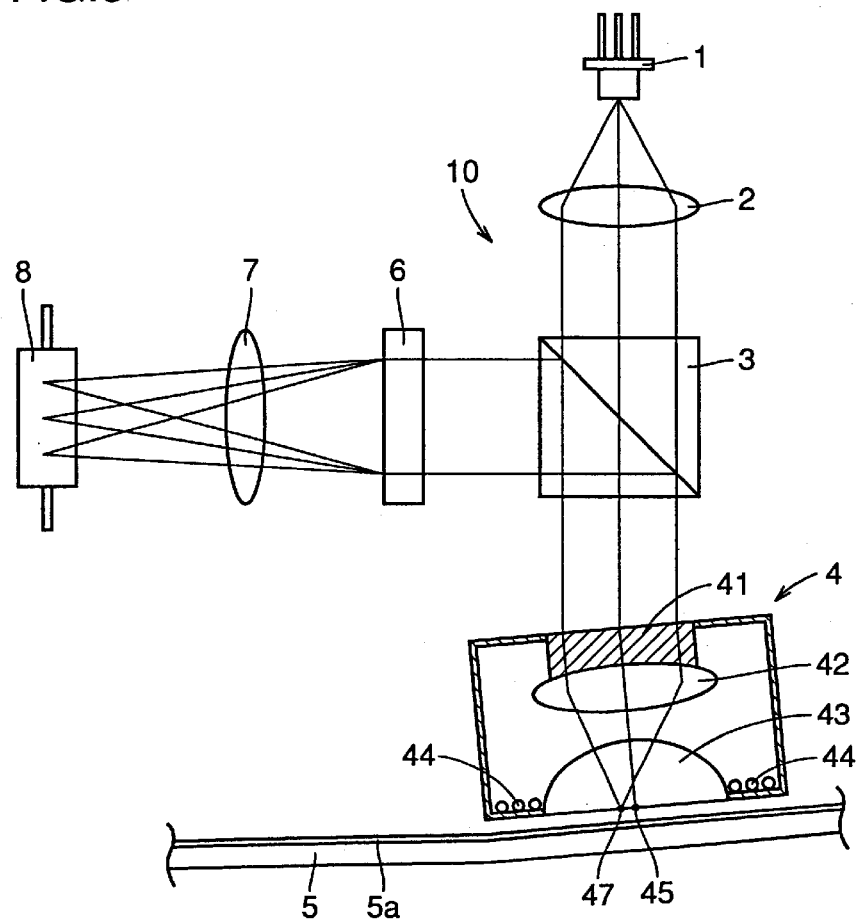
FIG. 8 is a diagram shown in conjunction with an operation of the magneto-optical head apparatus shown in FIG. 7 when tilt is caused.

Even when magneto-optical head 4 tilts due to tilt caused to magneto-optical recording medium 5 as shown in FIG. 8, the laser beam is refracted by optical member 41 to a direction which allows decrease in the tilt angle as described above. Thus, the laser beam is collectively directed to a point 47 which is close to proper point 45. As a result, the problem associated with tilt is alleviated and a signal is recorded/reproduced to/from magneto-optical recording medium 5.

Figure 9:
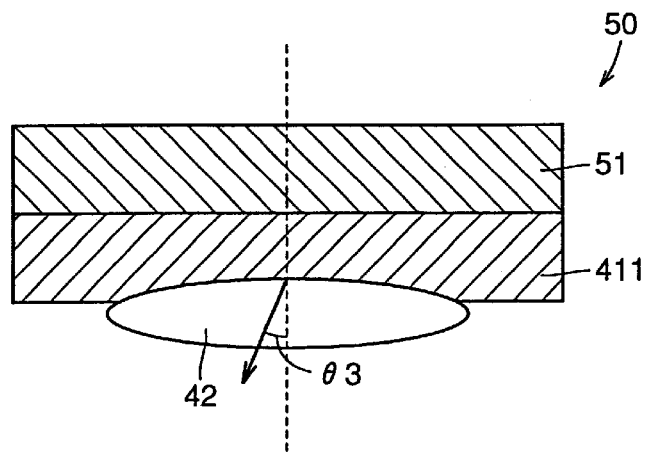
FIG. 9 is a cross sectional view showing still another example of the optical member shown in FIG. 2A.

The optical member used for the magneto-optical head apparatus according to the present invention may be an optical member 50 shown in FIG. 9. Unlike optical member 41 shown in FIG. 2A, optical member 50 includes a first member 51 and a second member 411 in a region through which the laser beam passes. First and second members 51 and 411 respectively have refractive indices n1 and n2 of 1.5 (with tolerance of ±0.1) and 2.0 (with tolerance of ±0.1) or 2.5 (with tolerance of ±0.1). For a material of first member 51, for example, glass is employed. For a material of second member 411, for example, SiN is employed when the refractive index is 2.0 and diamond is employed when the refractive index is 2.5.

The following Tables 5 and 6 respectively show values obtained by calculating θ3 formed by the laser beam directed from second member 411 to objective lens 42 with respect to the original optical axis in accordance with the above equation (1) when second member 411 of optical member 50 has refractive index n2 of 2.0 and 2.5. The higher the refractive index is, the smaller the value of θ3 is. In other words, the tilt angle is decreased.

TABLE 5

Glass, SiN

| n0, | n1, | n2 | θ1 (mrad.) | θ2 (mrad.) | θ3 (mrad.) |
|---|---|---|---|---|---|
| n0 = 1.0, | n1 = 1.5, | n2 = 2.0 | 1.0 | 0.63 | 0.45 |
| n0 = 1.0, | n1 = 1.5, | n2 = 2.0 | 2.0 | 1.29 | 0.94 |
| n0 = 1.0, | n1 = 1.5, | n2 = 2.0 | 3.0 | 1.94 | 1.41 |
| n0 = 1.0, | n1 = 1.5, | n2 = 2.0 | 4.0 | 2.58 | 1.88 |
| n0 = 1.0, | n1 = 1.5, | n2 = 2.0 | 5.0 | 3.23 | 2.35 |

TABLE 6

Glass, Diamond

| n0, | n1, | n2 | θ1 (mrad.) | θ2 (mrad.) | θ3 (mrad.) |
|---|---|---|---|---|---|
| n0 = 1.0, | n1 = 1.5, | n2 = 2.5 | 1.0 | 0.63 | 0.37 |
| n0 = 1.0, | n1 = 1.5, | n2 = 2.5 | 2.0 | 1.29 | 0.75 |
| n0 = 1.0, | n1 = 1.5, | n2 = 2.5 | 3.0 | 1.94 | 1.12 |
| n0 = 1.0, | n1 = 1.5, | n2 = 2.5 | 4.0 | 2.58 | 1.50 |
| n0 = 1.0, | n1 = 1.5, | n2 = 2.5 | 5.0 | 3.23 | 1.88 |

Figure 10:
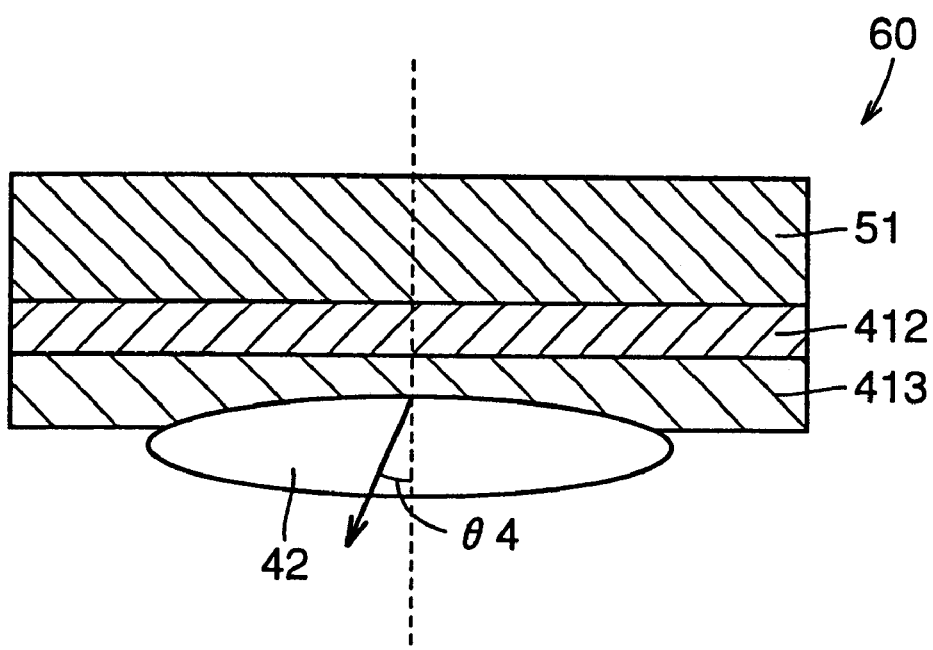
FIG. 10 is a cross sectional view showing still another example of the optical member shown in FIG. 2A.

Further, the optical member may be an optical member 60 shown in FIG. 10. Optical member 60 includes two parts forming second member 411 of optical member 50. More specifically, optical member 60 includes a first member 51, second member 412 and third member 413. First member 51 is the same as in the case of FIG. 9. A refractive index n2 of second member 412 is 2.0 (with tolerance of ±0.1), and a refractive index n3 of third member 413 is 2.5 (with tolerance of ±0.1). For a material of second member 412, for example, SiN is employed. For a material of third member 413, for example, diamond is employed.

The following Table 7 shows results obtained by calculating values of θ4 formed by the laser beam directed to objective lens 42 from third member 413 with respect to the original optical axis in accordance with the above equation (1). The values of θ4 is smaller than the values of θ3 in Tables 5 and 6. The tilt angle can further be decreased by using optical member 60 having the structure shown in FIG. 10.

TABLE 7

Glass, SiN, Diamond

| n0, | n1, | n2, | n3 | θ1(mrad.) | θ2(mrad.) | θ3(mrad.) | θ4(mrad.) |
|---|---|---|---|---|---|---|---|
| n0 = 1.0, | n1 = 1.5, | n2 = 2.0, | n3 = 2.5 | 1.0 | 0.63 | 0.45 | 0.35 |
| n0 = 1.0, | n1 = 1.5, | n2 = 2.0, | n3 = 2.5 | 2.0 | 1.29 | 0.94 | 0.73 |
| n0 = 1.0, | n1 = 1.5, | n2 = 2.0, | n3 = 2.5 | 3.0 | 1.94 | 1.41 | 1.09 |
| n0 = 1.0, | n1 = 1.5, | n2 = 2.0, | n3 = 2.5 | 4.0 | 2.58 | 1.88 | 1.46 |
| n0 = 1.0, | n1 = 1.5, | n2 = 2.0, | n3 = 2.5 | 5.0 | 3.23 | 2.35 | 1.82 |

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magneto-optical head recording and/or reproducing a signal to/from a magneto-optical recording medium by a laser beam and a magnetic field, comprising:

a first lens having an end face opposite to said magneto-optical recording medium, converting said laser beam to an evanescent light and directing said evanescent light from said end face to said magneto-optical recording medium;

a second lens fixed to said first lens for collecting said laser beam at an intersecting point of an optical axis of said first lens and said end face;and an optical member fixed to said second lens for refracting said laser beam toward a direction in which an optical axis of said laser beam comes closer to an optical axis of said second lens in accordance with tilt caused to said magneto-optical recording medium.

2. The magneto-optical head according to claim 1, further comprising a coil wound around said first lens.

3. The magneto-optical head according to claim 1, wherein said first lens is a solid immersion lens.

4. The magneto-optical head according to claim 1, wherein said optical member is in contact with said second lens.

5. The magneto-optical head according to claim 4, wherein said optical member includes a first member provided on said incident side and having a hole at a center, and a second member provided on said emitting side.

6. The magneto-optical head according to claim 5, wherein said second member includes SiN having a refractive index of 1.9 to 2.1.

7. The magneto-optical head according to claim 5, wherein said second member essentially consists of diamond.

8. The magneto-optical head according to claim 5, wherein said second member includes a first sub-member provided on said incident side and having a refractive index of 1.9 to 2.1, and a second sub-member provided on said emitting side and having a refractive index of 2.4 to 2.6.

9. The magneto-optical head according to claim 4, wherein said optical member has a refractive index increasing from an incident side to an emitting side for said laser beam.

10. The magneto-optical head according to claim 9, wherein said optical member includes
a first member provided on said incident side and having a first refractive index,
a second member provided closer to said emitting side than said first member and having a second refractive index higher than said first refractive index, and
a third member provided on said emitting side and having a third refractive index higher than said second refractive index.

11. The magneto-optical head according to claim 10, wherein said first refractive index is 1.45 to 1.55, said second refractive index is 1.9 to 2.1 and said third refractive index is 2.4 to 2.6.

12. The magneto-optical head according to claim 9, wherein said optical member includes
a first member provided on said incident side and having a first refractive index, and
a second member provided on said emitting side and having a second refractive index higher than said first refractive index.

13. The magneto-optical head according to claim 12, wherein said first refractive index is 1.45 to 1.55 and said second refractive index is 1.9 to 2.1.

14. The magneto-optical head according to claim 12, wherein said first refractive index is 1.45 to 1.55 and said second refractive index is 2.4 to 2.6.

* * * * *